US010633191B2

(12) United States Patent
Galimberti et al.

(10) Patent No.: US 10,633,191 B2
(45) Date of Patent: Apr. 28, 2020

(54) MOVABLE PLATFORM FOR A SKILLET CONVEYOR SYSTEM OF A VEHICLE ASSEMBLY LINE

(71) Applicant: C I E M—Societa' Per Azioni, Cassino (IT)

(72) Inventors: Massimiliano Galimberti, Scalenghe (IT); Mario Vizzaccaro, Villa Santa Lucia (IT)

(73) Assignee: C I E M—Societa' Per Azioni, Cassino (IT)

( * ) Notice: Subject to any disclaimer, the term of this patent is extended or adjusted under 35 U.S.C. 154(b) by 0 days.

(21) Appl. No.: 15/811,247

(22) Filed: Nov. 13, 2017

(65) Prior Publication Data

US 2019/0031447 A1 Jan. 31, 2019

(30) Foreign Application Priority Data

Jul. 28, 2017 (IT) .................. 102017000087212

(51) Int. Cl.
| | | |
|---|---|---|
| *B05B 13/02* | (2006.01) | |
| *B62D 65/18* | (2006.01) | |
| *B65G 47/24* | (2006.01) | |

(52) U.S. Cl.
CPC ............. *B65G 47/24* (2013.01); *B62D 65/18* (2013.01)

(58) Field of Classification Search
CPC . B62D 65/18; B05B 13/0221; B05B 13/0235; B05B 13/0452; B05D 1/002; Y10T 29/49829; B65G 47/24
USPC ........ 198/346.1, 373, 465.1; 269/17, 57, 61; 29/430, 563; 409/221, 225, 227; 414/758, 771, 773, 780, 783, 791.3; 427/425

See application file for complete search history.

(56) References Cited

U.S. PATENT DOCUMENTS

| | | | | |
|---|---|---|---|---|
| 2,227,688 A | * | 1/1941 | Wood ................. | B23K 37/0452 269/296 |
| 2,522,037 A | * | 9/1950 | Hall ......................... | B63B 9/00 114/359 |
| 2,680,420 A | * | 6/1954 | Sheffer ................ | B23K 37/047 269/107 |
| 3,198,362 A | * | 8/1965 | Berg ..................... | B66F 19/005 254/131 |
| 4,160,507 A | * | 7/1979 | Mullins ................ | B65G 47/904 198/374 |
| 4,491,308 A | * | 1/1985 | Walton .................... | B23Q 3/10 269/296 |
| 4,662,607 A | * | 5/1987 | Mochizuki ............ | B66F 19/005 254/131 |
| 4,695,037 A | * | 9/1987 | Hadbavny ............. | B66F 19/005 254/131 |
| 4,715,775 A | * | 12/1987 | Amino ................. | B23K 3/0646 269/60 |
| 4,787,801 A | * | 11/1988 | Ahlsen ................... | B62D 65/18 269/56 |
| 4,874,639 A | * | 10/1989 | Matsui ............... | B05B 13/0221 427/240 |

(Continued)

*Primary Examiner* — Gregory W Adams
(74) *Attorney, Agent, or Firm* — Stetina Brunda Garred & Brucker (57) ABSTRACT

A movable platform for a skillet conveyor system of a vehicle assembly line, the movable platform comprising rotation means for rotating a body of a vehicle, said rotation means being fixed to the movable platform and completely integrated with said movable platform.

14 Claims, 10 Drawing Sheets

(56) References Cited

U.S. PATENT DOCUMENTS

| | | | | |
|---|---|---|---|---|
| 5,149,371 A | * | 9/1992 | Tateuchi | B05B 13/0235 |
| | | | | 118/324 |
| 5,438,766 A | * | 8/1995 | Nakamura | D06F 95/00 |
| | | | | 34/595 |
| 5,686,148 A | * | 11/1997 | Suzuki | B05B 13/0235 |
| | | | | 118/320 |
| 5,743,962 A | * | 4/1998 | Ogasawara | B05B 13/0221 |
| | | | | 104/104 |
| 5,888,043 A | * | 3/1999 | Jatcko | B66C 1/66 |
| | | | | 414/459 |
| 6,299,405 B1 | * | 10/2001 | Sterken | B21B 39/32 |
| | | | | 198/403 |
| 8,360,388 B1 | * | 1/2013 | Murata | B66C 1/66 |
| | | | | 248/671 |
| 8,608,423 B2 | * | 12/2013 | Hsu | B65G 47/24 |
| | | | | 414/763 |
| 8,882,094 B2 | * | 11/2014 | Kim | B62D 65/026 |
| | | | | 254/100 |
| 9,284,132 B2 | * | 3/2016 | Hawighorst | B65G 47/252 |
| 2011/0020103 A1 | * | 1/2011 | Shonai | B65G 47/90 |
| | | | | 414/783 |

* cited by examiner

MOVABLE PLATFORM FOR A SKILLET CONVEYOR SYSTEM OF A VEHICLE ASSEMBLY LINE

CROSS REFERENCE TO RELATED APPLICATION(S)

The present application claims priority to Italian Patent Application No. 102017000087212 filed Jul. 28, 2017, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a movable platform for a skillet conveyor system of a vehicle assembly line, in particular for motor vehicles, e.g. cars.

PRIOR ART

A skillet is a conveyor system formed by continuous platforms actuated by fixed drives.

Each platform can convey a body of a vehicle, e.g. of a motor vehicle, along a working line.

Typically, devices are installed on these movable platforms which allow the vertical lifting of the bodies, e.g. of the car bodies.

Disadvantageously, the rotation of the body occurs by means of other systems instead, typically by means of gates or rotating hooks, which are fixed to the structure of the factory. For example, the rotation systems hang from the upper scaffolding of the industrial sheds. Such structures must support heavy loads, and so they must be very high-performing and costly, and check and maintenance operations are also necessary.

Furthermore, when the bodies are turned, the operators must disadvantageously work on the floor, which is fixed. This slows the body working process.

The need for a movable platform capable of overcoming the aforesaid drawbacks is therefore felt.

SUMMARY OF THE INVENTION

It is an object of the present invention to make a movable platform for a skillet conveyor system which also makes it possible to rotate the body of a vehicle, e.g. of a motor vehicle, such as a car.

The present invention achieves these and other objects which will be apparent in light of the present invention, by providing a movable platform for a skillet conveyor system of an assembly line of vehicles, in particular of motor vehicles, the movable platform comprising rotation means for rotating a vehicle body, said rotation means being fixed to the movable platform and completely integrated with said movable platform.

Advantageously, such platform makes it possible to rotate the body by any angle, preferably comprised between −90° and +90°.

In this way, an operator, or a robot, can access the undercarriage, i.e. the lower part of the body. In particular, by means of the platform of the invention, the worker can access the undercarriage easily and ergonomically. The body is indeed at an optimal height and rotation angle also when jobs must be performed on its lower part.

Furthermore, when the body is rotated, the worker can remain on the platform, which moves along the working line or assembly line. The working process is thus optimized, and it is possible to work with rotated bodies continuously and/or to make working stations with a stop-and-go type cadence.

The speed of the movable platform may be advantageously set according to the needs of the working line.

Further advantages of the platform of the invention consist in very small dimensions and absence of loads on the factory structure, e.g. on the scaffolding of an industrial shed. Indeed, the rotation system is integrated in the platform itself.

The platform is substantially on floor level and this is another advantage.

In general, the platform of the invention is versatile, quiet, efficient and easy to maintain. Furthermore, the platform can provide a safe and ergonomic working area for operators.

Since the workers are transported together with the body aboard the platform, all jobs are particularly easy and safe. This makes it possible to obtain a continuous and perfectly synchronized production flow, as required in modern industrial systems.

Furthermore, the body may be rotated by a very precise rotation angle, and can be blocked in position very reliably both when it is rotated, e.g. rotated with respect to a "zero" position, and when it is in the "zero" position.

According to an aspect, the invention also provides a skillet conveyor system of a motor vehicle assembly line comprising a plurality of such movable platforms arranged in sequence along the assembly line.

Further features and advantages of the present invention will be more apparent in light of the detailed description of preferred, but not exclusive embodiments.

The dependent claims describe particular embodiments of the invention.

BRIEF DESCRIPTION OF THE FIGURES

The description of the invention refers to the accompanying drawings, which are provided by way of non-limiting example, in which.

The same references in the figures identify the same elements or similar elements or components.

DETAILED DESCRIPTION OF EXAMPLE EMBODIMENTS OF THE INVENTION

Figure 1:
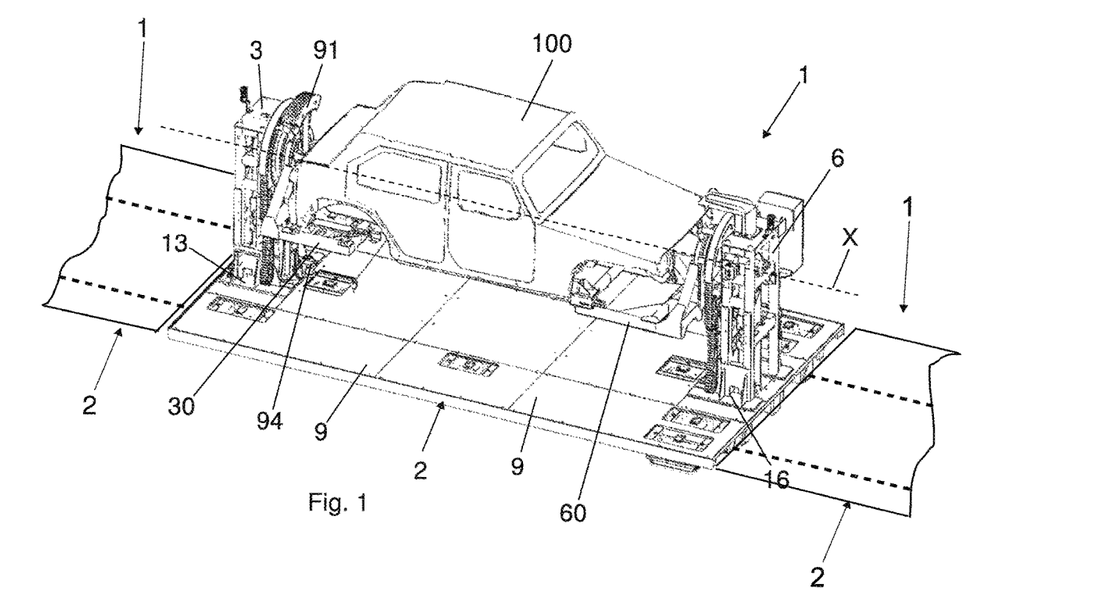
FIG. 1 shows a perspective view of one side of a platform according to the invention.

A movable platform 1 for a skillet conveyor system of a motor vehicle assembly line is shown with particular reference to FIG. 1. The movable platform 1, also named platform, comprises a frame 2. The frame 2 has a substantially flat upper surface, which acts as floor which can be trodden by an operator. Typically, such flat surface is defined by panels 9, preferably made of wood, placed mutually side-by-side.

The platform 1 is defined movable in particular because it can slide along a track along the assembly line, or working line, of a body 100 of a vehicle. For this purpose, the frame 2 is provided with means which interact with the rail (not shown), in particular with the rails of the track. For example, the frame 2 may be provided, at the lower part thereof, with wheels (not shown) which make it possible to guide and make the platform 1 slide along such rails. Furthermore, the platform 1 is preferably provided with a movement system (not shown), e.g. means which interact with ground-fixed thrust means.

Two structures or columns 3, 6 extend upwards from the frame 2. In particular, the base 13, 16 of each column 3, 6 is fixed to the upper surface of the frame 2, from which the columns 3, 6 extend orthogonally. The columns 3, 6 are arranged at respective mutually opposite ends of the platform 1.

A rotation device, for rotating the body of a vehicle, is fixed to the movable platform 1 and completely integrated with said movable platform. Said rotation device comprises a first rotatable support 30 for supporting and rotating the a front part of the body, arranged at a first end of the movable platform, and a second rotatable support 60, arranged at a second end of the movable platform, opposite to the first end.

The rotatable support 30 is constrained to the column 3 and the rotatable support 60 is constrained to the column 6. The rotatable supports may also be named rotary supports or simply supports. The rotatable support 60 is used to support the front part of the body 100 of the vehicle, and the rotatable support 30 is used to support the rear part of the body 100. The rotatable supports 30, 60 face each other and are mutually distanced apart.

The rotatable supports 30, 60 can rotate simultaneously with respect to the respective column 3, 6. In particular, each rotatable support 30, 60 can rotate about an axis X, which is preferably parallel to the longitudinal axis of the platform 1. The rotation can occur in both senses.

In the configuration shown in FIG. 1, the rotatable supports 30, 60 are arranged so that the lower part of the body 100 completely faces towards the frame 2. This configuration is also defined zero position. Preferably, starting from the configuration shown in FIG. 1, the rotatable supports 30, 60 can rotate by an angle comprised between +90° and −90°. In other words, the body 100 can be rotated either in one sense of rotation or in the opposite sense of rotation by an angle preferably comprised between +90° and −90° with respect to when the lower part of the body 100 is facing completely towards the frame 2.

Figure 2:
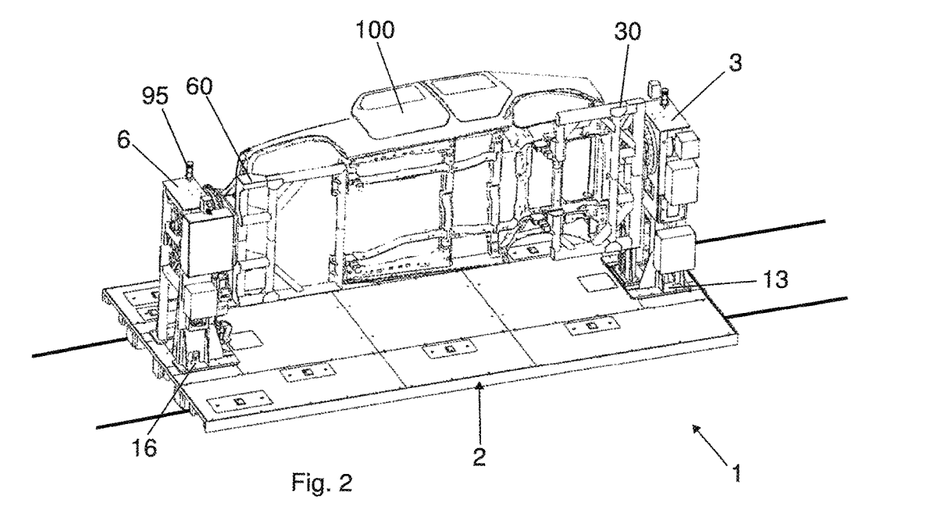
FIG. 2 shows a perspective view of another side of a platform in FIG. 1.

In the configuration shown in FIG. 2, the body 100 is rotated by approximately 90° with respect to the configuration shown in FIG. 1. In particular, one side, or flank, of the body 100 completely faces towards the frame 2.

Figure 3:
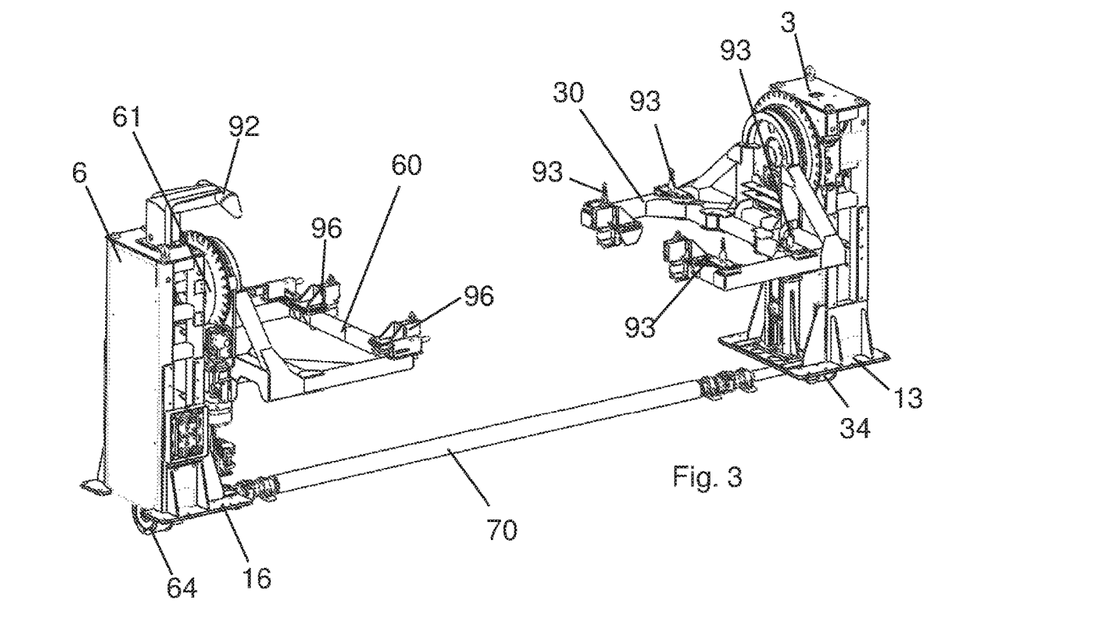
FIG. 3 shows a perspective view of some components of the platform in FIG. 2.
Figure 4:
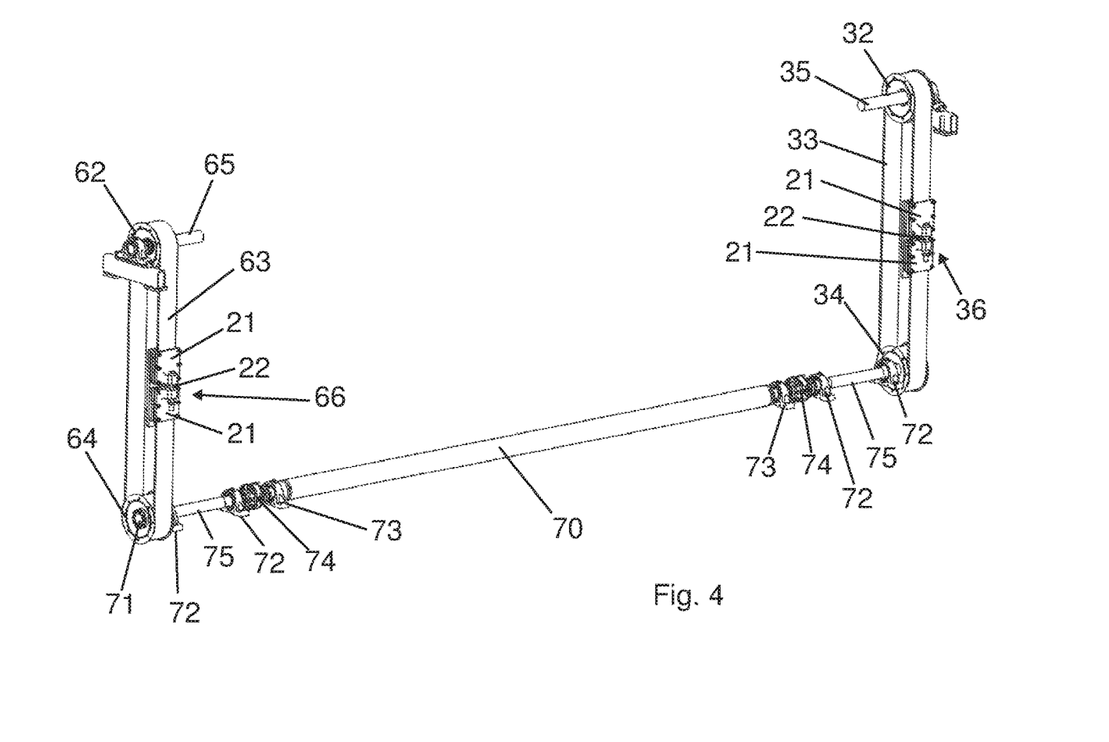
FIG. 4 shows a perspective view of some components of the platform in FIG. 2.

The rotation system of the body 100 is illustrated more in details with reference to FIGS. 3 and 4. In order to be able to rotate, one of the two rotatable supports, e.g. rotatable support 60 is motorized, and the other of the two rotatable supports, e.g. rotatable support 30, is driven.

As mentioned, the two rotatable supports 30, 60 rotate together, i.e. the rotation of the two rotatable supports 30, 60 is synchronized. For this purpose, synchronization means are provided to synchronize the rotation of the two rotatable supports 30, 60. As described below, there is provided a synchronization mechanism comprising rotation transmission devices or members, some of which are arranged inside the frame 2.

In particular, the rotatable support 60 of the column 6 receives motion from a motorized slewing ring 61. The rotatable support 30 of the column 3, by means of a transmission system, receives motion from the motorized slewing ring 61 of the other column, e.g. from column 6.

More in detail, a respective belt transmission system is provided inside the column 3, 6. The belt transmission system of each column 3, 6 comprises a respective pair of toothed pulleys. In particular, the belt transmission system of column 6 comprises a lower pulley 64 and an upper pulley 62; and the belt transmission system of column 3 comprises a lower pulley 34 and an upper pulley 32. Each lower pulley 34, 64 protrudes from the bottom of the respective column 3, 6.

The rotatable support 60 is constrained to the motorized slewing ring 61, so that the motorized slewing ring 61 allows the rotation of the rotatable support 60.

Furthermore, the motorized slewing ring 61 is constrained to an upper transmission shaft 65, constrained in turn to the upper pulley 62. The upper pulley 62 rotates the respective lower pulley 64 by means of the belt 63.

A lower transmission shaft 70 is connected to the two lower pulleys 34, 64. The lower pulley 64 of the column 6 transmits the motion to the lower transmission shaft 70 and to the lower pulley 34 of the column 3. The lower pulley 34 rotates the respective upper pulley 32 by means of the belt 33. The lower pulley 32 rotates the support 30 constrained to it by means of an upper transmission shaft 35.

The lower pulleys 34, 64 and the transmission shaft 70 are arranged inside the frame 2, underneath the panels 9.

Figure 5:
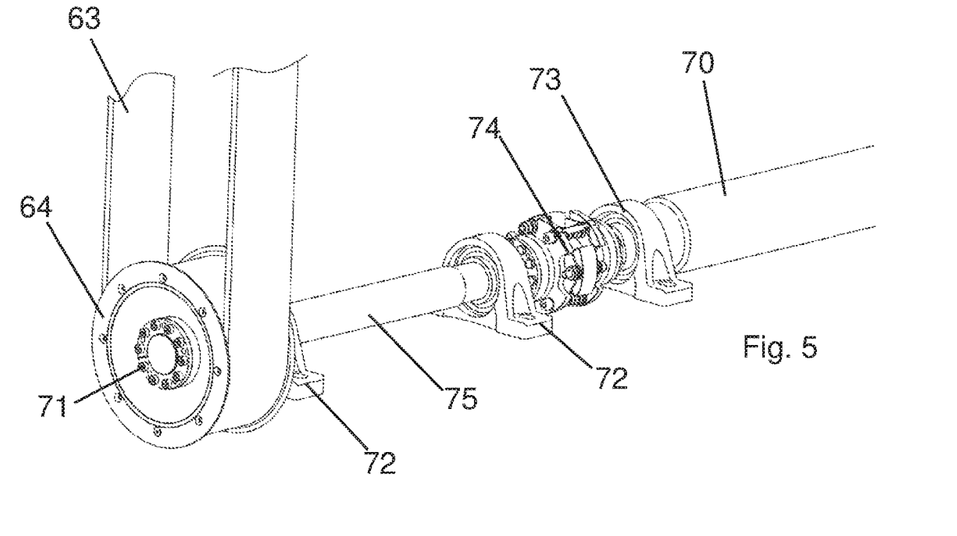
FIG. 5 shows a perspective view of a detail in FIG. 4.

With reference also to FIG. 5, a respective shaft 75 is inserted in each lower pulley 34, 64. Each shaft 75 is integrally constrained to the respective lower pulley 34, 64 by means of a respective coupler or fitter 71.

Each shaft 75 is supported by two bearings 72 preferably arranged at two respective ends zones thereof. Preferably, the bearings 72 are fixed to the frame 2.

The shafts 75 are substantially aligned with the lower shaft 70, and preferably have a shorter length with respect to the lower shaft 70.

The end of each shaft 75, in particular the end which is distal from the respective lower pulley 34, 64, is connected to an end of the lower transmission shaft 70. Such connection is achieved by means of a joint, which is preferably a lamellar coupling 74, which typically has a high torsional rigidity and minimum inversion clearances or jokes.

The lower transmission shaft 70 is also supported by two bearings 73. Each bearing 73 is preferably arranged at a respective end zone of the lower transmission shaft 70.

The belts 33, 63 are typically toothed belts.

The belts 33, 63 are each provided with a tensioning device 36, 66, which keeps the respective belt 33, 63 taut and closed to make a substantially closed ring. By way of example only, the tensioning device 36, 66 is formed by two plates 21, each of which fixed to a respective end of the belt 33, 63. The plates 21 are held together by a pin 22. Preferably, the pin 22 is threaded, so as to be adjustable, i.e. to be regulated.

Figure 6:
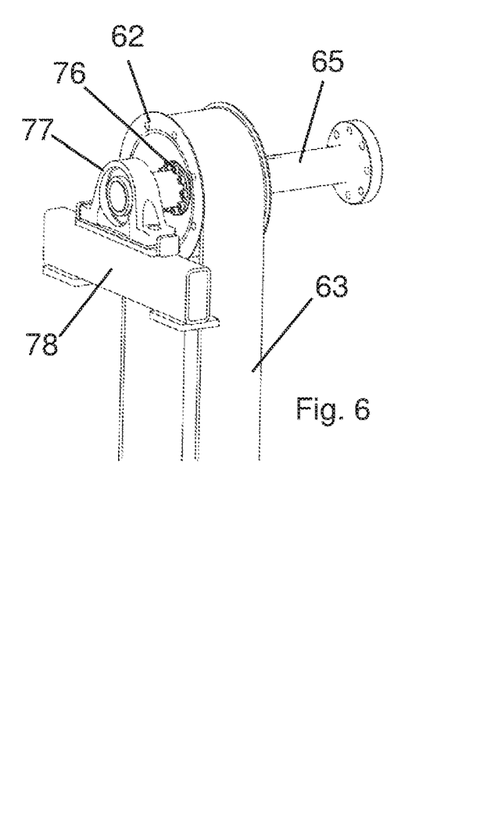
FIG. 6 shows a perspective view of a detail in FIG. 4.
Figure 7:
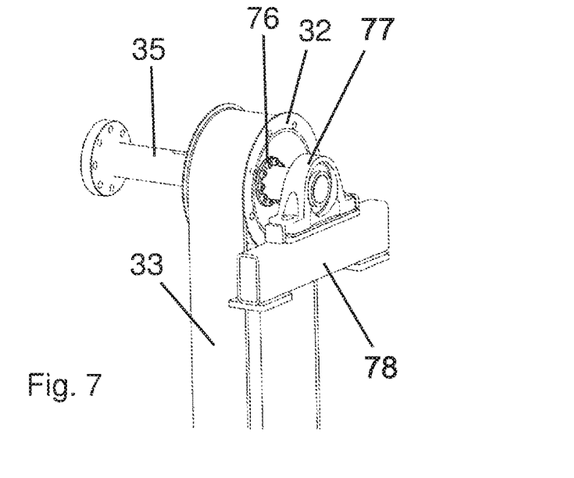
FIG. 7 shows a perspective view of a detail in FIG. 4.

With reference to FIGS. 6 and 7, for both belt transmission systems, the upper transmission shaft 35, 65 is inserted in the upper pulley 32, 62, and coupled to it by means of a coupler or fitter 76. By means, in particular, of the fitter 76, the upper transmission shaft 35, 65 can transmit motion to the respective lower pulley 32, 62. Preferably, the upper transmission shaft 35, 65 is supported by a counter-support 77 fixed to a crossbar 78 of the column 3, 6. In other words, the upper transmission shaft 35, 65 is not cantilevered. In this way, the bending of the upper transmission shaft 35, 65, which is subjected to a rather high pull, is avoided.

Figure 8:
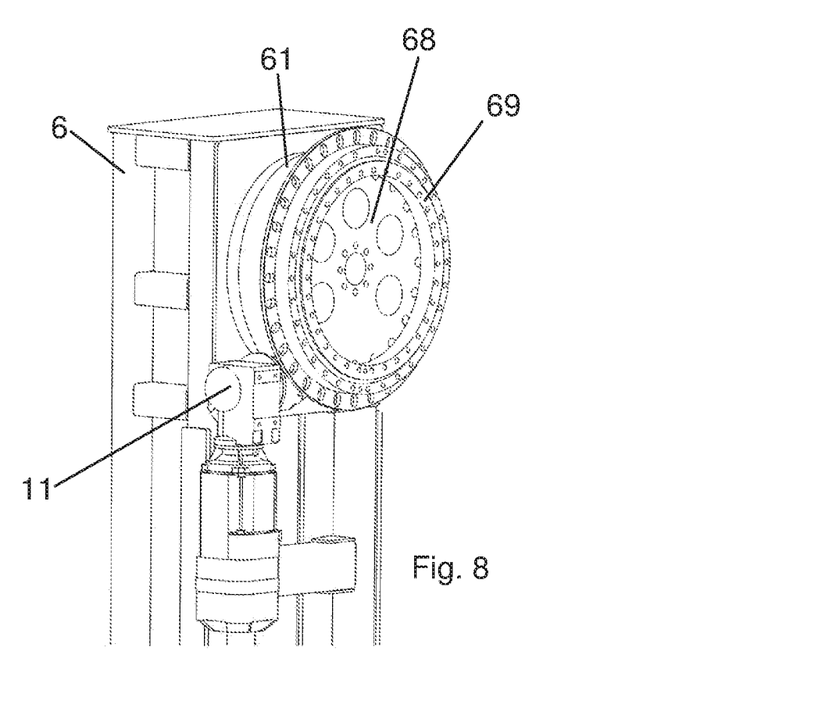
FIG. 8 shows a perspective view of some components of the platform in FIG. 2.
Figure 9:
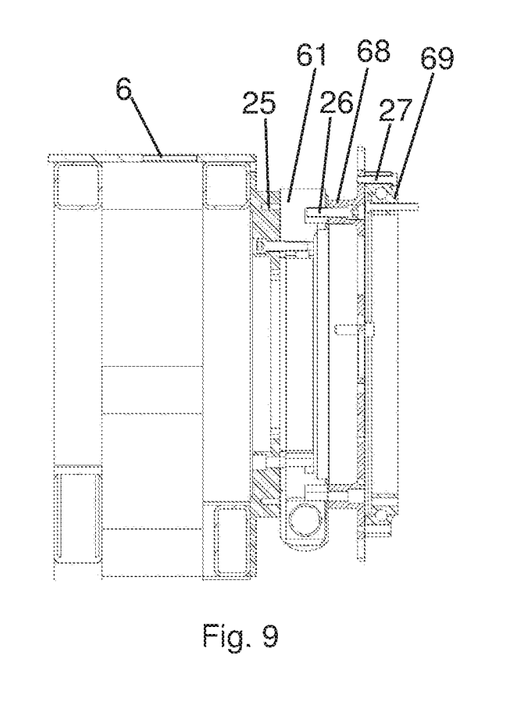
FIG. 9 shows a section view of some of the components in FIG. 8.

With reference to FIGS. 8 and 9, the motorized slewing ring 61 is actuated by actuating means, e.g. a ratio motor 11, typically a self-braking ratio motor.

Typically, the motorized slewing ring 61 is of the geared type. In particular, the motorized slewing ring 61 has an outer toothed ring, on which a worm screw acts, while the inside of the ring is smooth. The rotating elements inside the motorized slewing ring 61 are balls.

The motorized slewing ring 61, in particular its fixed part, is fixed to the column 6 by means of pins 25. An interface disc 68 is constrained to the motorized slewing ring 61. A slewing ring, in particular an idle slewing ring 69, is constrained to the interface disc 68. The interface disc 68 is interposed between the motorized slewing ring 61 and the idle slewing ring 69. In particular, the interface disc 68 is integrally fixed to the motorized slewing ring 61 by means of pins 26, and the idle slewing ring 69 is fixed integrally to the interface disc 68 by means of pins 27.

Figure 10:
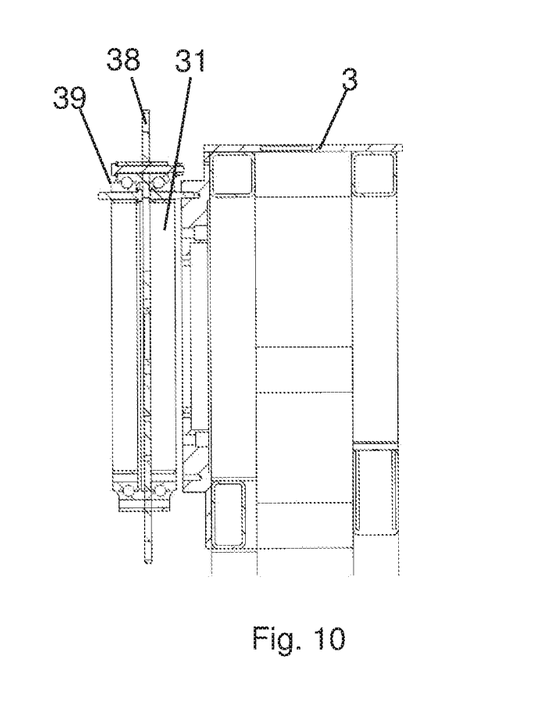
FIG. 10 shows a section view of some components of a platform according to the invention.

With reference to FIG. 10, the column 3 comprises two slewing rings, in particular two idle slewing rings 31, 39, between which there is an interface disc 38. The idle slewing rings 31, 39 and the interface disc 38 are constrained to each other so as to be able to rotate integrally with respect to each other. The idle slewing ring 31 is proximal to the column 3, the idle slewing ring 39 is distal from the column 3.

Figure 11:
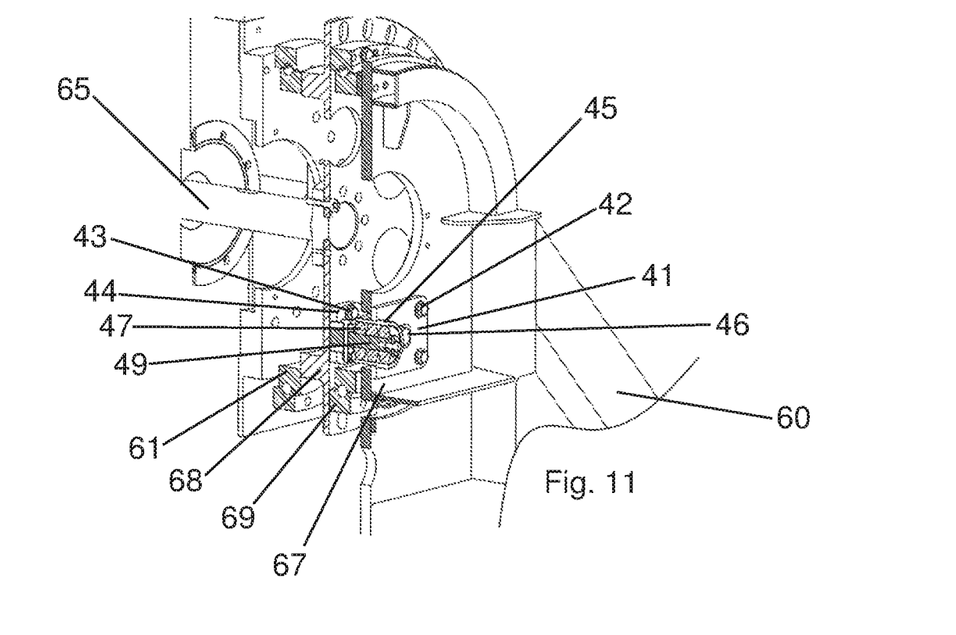
FIG. 11 shows a perspective section view of some components of a platform according to the invention.
Figure 12:
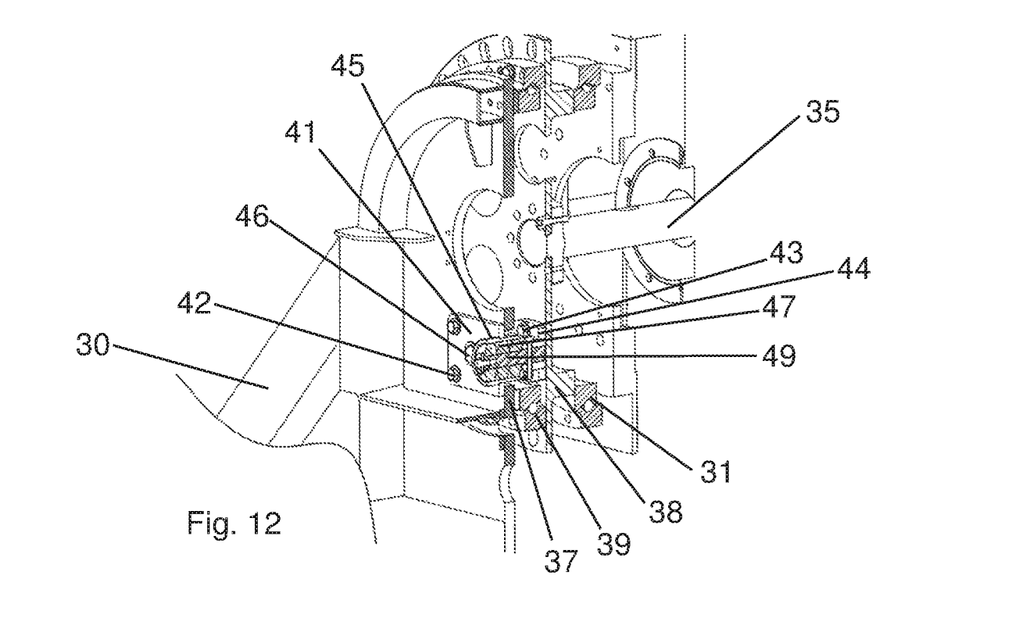
FIG. 12 shows a perspective section view of some components of a platform according to the invention.
Figure 12A:
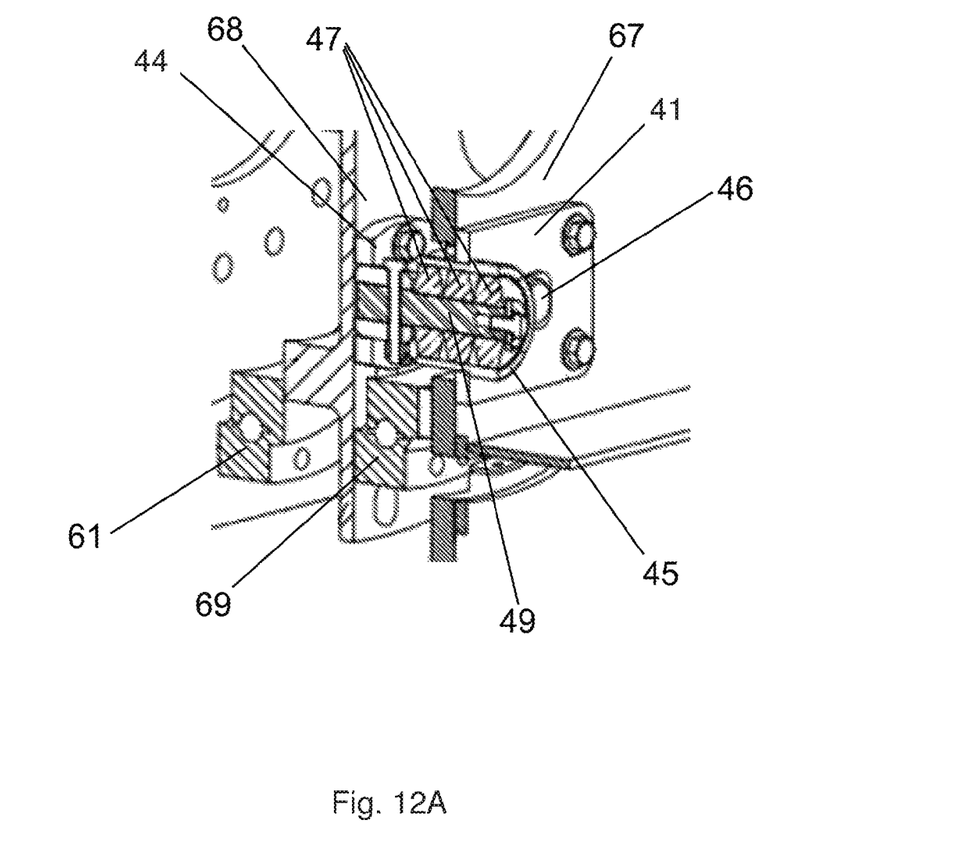
FIG. 12A shows a detail of FIG. 11.

With reference to FIGS. 11, 12 and 12A, the rotatable support 60, in particular an attachment portion 67, or rear portion, of the rotatable support 60, is integrally fixed to the idle slewing ring 69.

The rotatable support 30, in particular an attachment portion 37 of the rotatable support 30, is fixed to the idle slewing ring 39.

Figure 13:
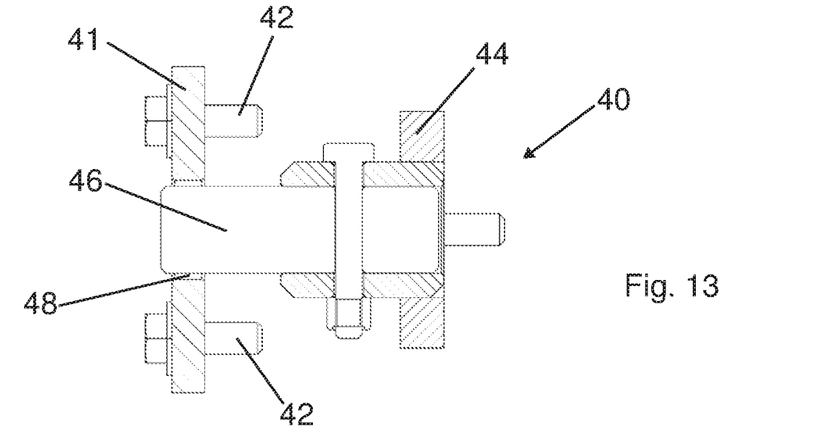
FIG. 13 shows a section view of some components of a platform according to the invention.
Figure 14:
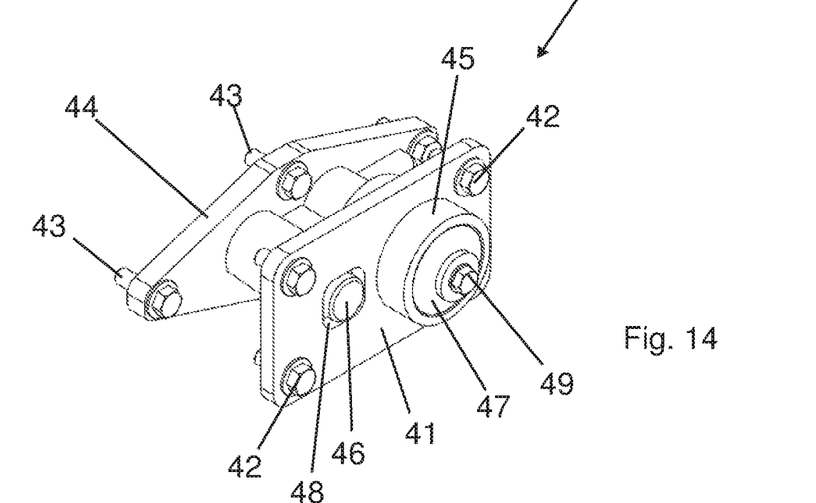
FIG. 14 shows a perspective view of the components in FIG. 13.
Figure 15:
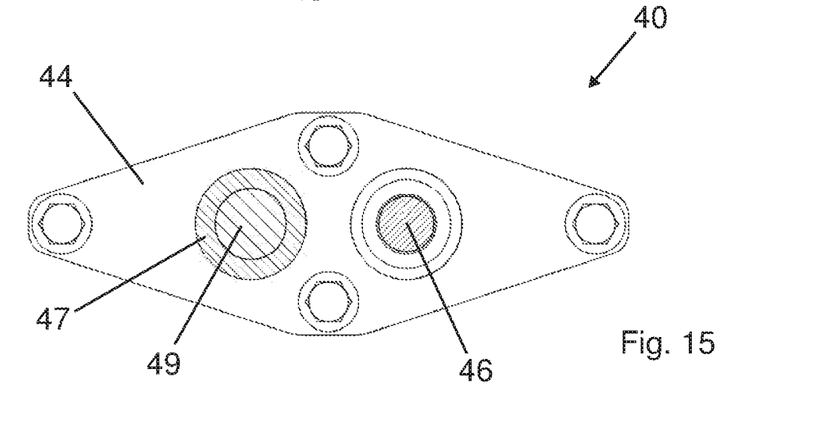
FIG. 15 shows a section view of the components in FIG. 13.

Furthermore, each attachment portion 37, 67 is constrained to the respective interface disc 38, 68 by means of respective fixing means 40 shown in greater detail in FIGS. 13, 14, and 15.

The fixing means 40 comprise two plates 41, 44 substantially opposite to each other and mutually distanced.

The plate 41 is integrally fixed, by means of pins 42, to the attachment portion 37, 67 of the rotatable support 30, 60.

The other plate 44 is integrally fixed to the interface disc 38, 68 by means of pins 43. Two mutually parallel pins 46, 49 are provided, both inserted in the plate 41 and in the plate 44. The pins 46 and 49 are integral with the interface disc 38, 39.

The pin 49 is surrounded by at least one elastic bushing, i.e. is inserted in at least one elastic bushing 47. In particular, at least one vulcanized elastic bushing, or silent block, is provided. Preferably, three elastic bushings 47 are provided arranged mutually side-by-side along the axis of the pin 49. The elastic bushings 47 are inserted in a rigid bushing 45 and are in contact with the inner walls of such rigid bushing 45. The rigid bushing 45 is integral with the support 30, 60. In particular, the rigid bushing 45 is inserted in the plate 41.

The pin 46 is fixed to the plate 44, and inserted in a seat 48 of the plate 41. The outer dimensions of the pin 46 are smaller than the inner dimensions of the seat 48 of the plate 41 in which it is inserted, so as to allow clearance or jokes. For example, the outer dimensions of the pin 46 are from 6% to 22% smaller than the inner dimensions of the seat 48, i.e. of the gap in which it is inserted.

Figures 16, 17:
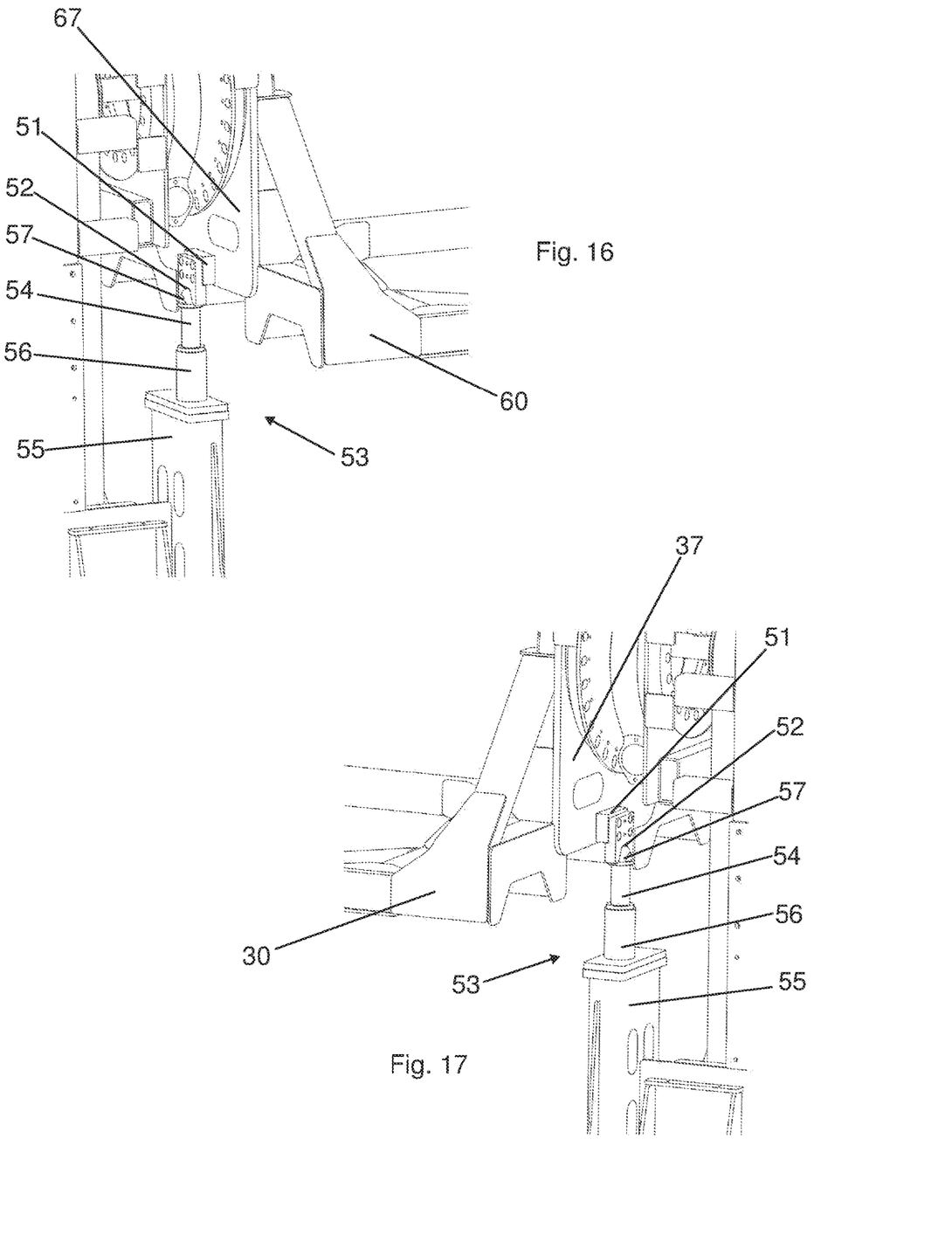
FIG. 16 shows a perspective view of some components of a platform according to the invention.
FIG. 17 shows a perspective view of some components of a platform according to the invention.

With reference to FIGS. 16 and 17, each rotatable support 30, 60 is provided with a block 51. In particular, the block 51 is fixed to a lower zone of the attachment portion 37, 67.

The block 51 is provided with an engagement seat 52 facing towards the frame 2. Preferably, such engagement seat 52 is substantially V-shaped, more preferably with a rounded tip facing upwards.

For each rotatable support 30, 60, there is a locking device 53, such as a shutter. Preferably, the base of the locking device 53 is fixed to the frame 2 or to the respective column 3, 6. The locking device 53 is substantially a cylinder-piston system. In particular said locking device 53 is provided with a piston 54, or sliding pin. The piston 54 is actuated by a pneumatic cylinder 55. The piston 54 is preferably provided with a stem lock 56. The stem lock 56 surrounds a longitudinal part of the piston 54, so that the reliability of the locking device 53 is always guaranteed even in case of air leaks.

The piston 54 has an end 57 shaped to engage in the engagement seat 52 of the block 51. So, if needed, by making the piston 54 slide, the end 57 can be inserted in the engagement seat 52. More in particular, the arrangement of locking device 53 and of the block 51 is such that the end 57 of the piston 54 can be inserted in the engagement seat 52 of the block 51 when the supports 30, 60 are rotated so as to be in the zero position.

Furthermore, the piston 54 can be inserted in the block 51 when the supports 30, 60 undesirably form an angle, different from zero, comprised between approximately −3° and +3° with respect to the zero position, i.e. because of clearance or jokes. Indeed, it can occur that, even if a rotation of the supports 30, 60 is controlled to bring said supports into the zero position, the supports 30, 60 may be in fact arranged with a given error angle, e.g. ±3°, with respect to the zero position.

In such condition, the insertion of the piston 54 in the block 51 causes the rotation of the supports 30, 60 so that they actually go to the zero position. In particular, inserting the piston 54 in the block 51 makes it possible to cancel any inversion clearance of the motorized slewing ring 61 and of the belt system or inaccurate positioning due to other causes, e.g. software type delays. The locking device 53 can be used to reset the error precisely by means of the engagement of the pin 54 in the block 51, forcing the rotation of the supports 30, 60 and locking them in a predetermined zero position with substantially absolute repeatability. Advantageously, the geometries of the piston 54, in particular of its end 57, and of the engagement seat 52 of the block 51 guarantee positioning accuracy also when the contact surfaces are worn.

Positioning accuracy of the supports 30, 60 in the zero position may be required, e.g. during the loading and unloading operations of the body 100, which are performed by means of robot.

It is worth noting that by providing the previously described fixing means 40, it is advantageously possible to correct the position of the rotatable supports 30, 60 without undesirably loading the other elements of the kinematic chain. Indeed, when the pin 54 is inserted in the block 51, the rotatable support 30, 60 is rotated and the elastic bushings 47 are compressed, absorbing the load generated by the insertion of the piston 54 in the block 51.

Optionally, the position of the rotatable supports 30, 60 can be corrected also for other rotation angles, different from that of the zero position. For this purpose, one or more further blocks, constructively similar to the block 51, appropriately arranged on the attachment position 37, 67, may be provided.

Figures 18, 19:
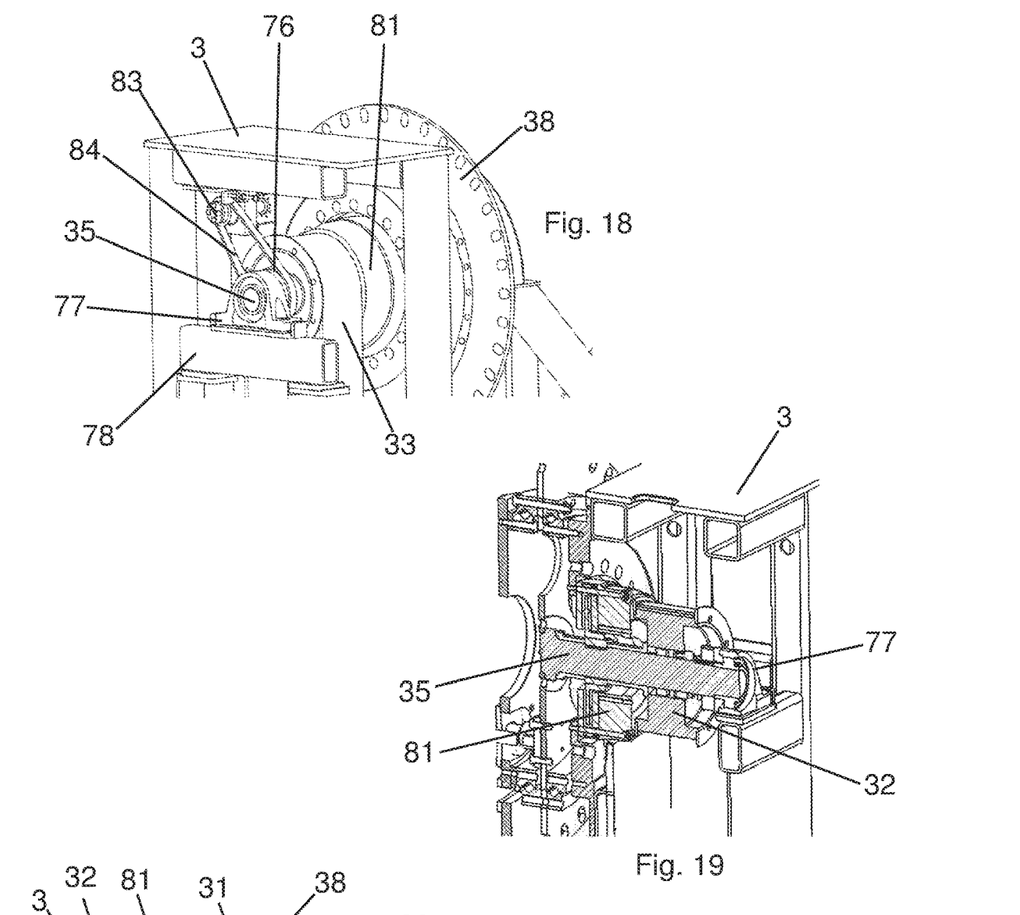
FIG. 18 shows a perspective view of some components of a platform according to the invention.
FIG. 19 shows a perspective section view of some components of a platform according to the invention.
Figure 20:
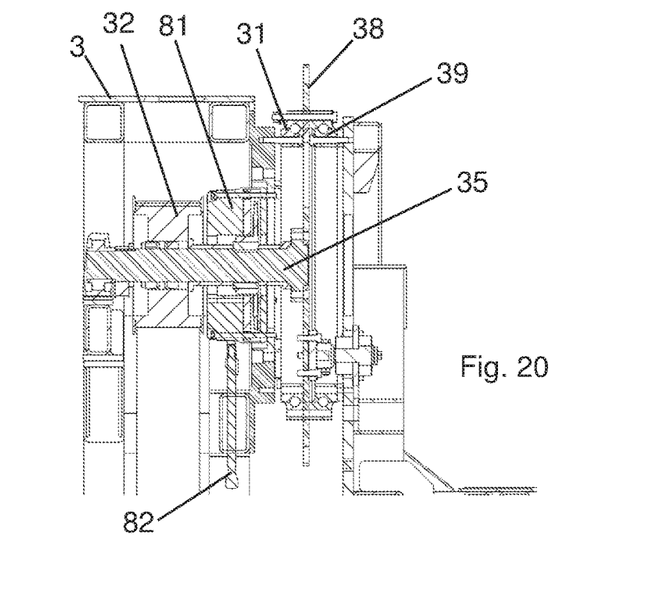
FIG. 20 shows a section view of the components in FIG. 19.

With reference to FIGS. 18, 19 and 20, the column 3 comprises a parking brake 81, preferably an electromechanical brake, which is used to lock the rotation of the support 30 if needed. The parking brake 81 is preferably provided with an automatically rearming release lever 82, with which it is possible to release the brake 81 also in absence of electrical current. Preferably, only the column 3 comprises the brake 81. The brake 81 is fitted directly onto the upper transmission shaft 35, and is always active. When it is electrically supplied, the brake 81 is deactivated, allowing the rotation of the upper transmission shaft 35. Advantageously, the brake 81 stabilizes the support 30, avoiding its undesired oscillations. The brake 81 also performs an important safety function. Indeed, by being active whenever the body 100 is not rotating, it guarantees that the support 30 does not move, also in an emergency situation, e.g. in case of breakage of the belt 33.

An encoder 83 is further provided, configured to control, in particular, the upper transmission shaft 35. The encoder 83 is connected to the upper transmission shaft 35 by means of a belt 84.

Preferably, the column 3 is provided with a counterweight 91 (FIG. 1) to reduce a possible imbalance of the support 30 as much as possible.

Figure 21:
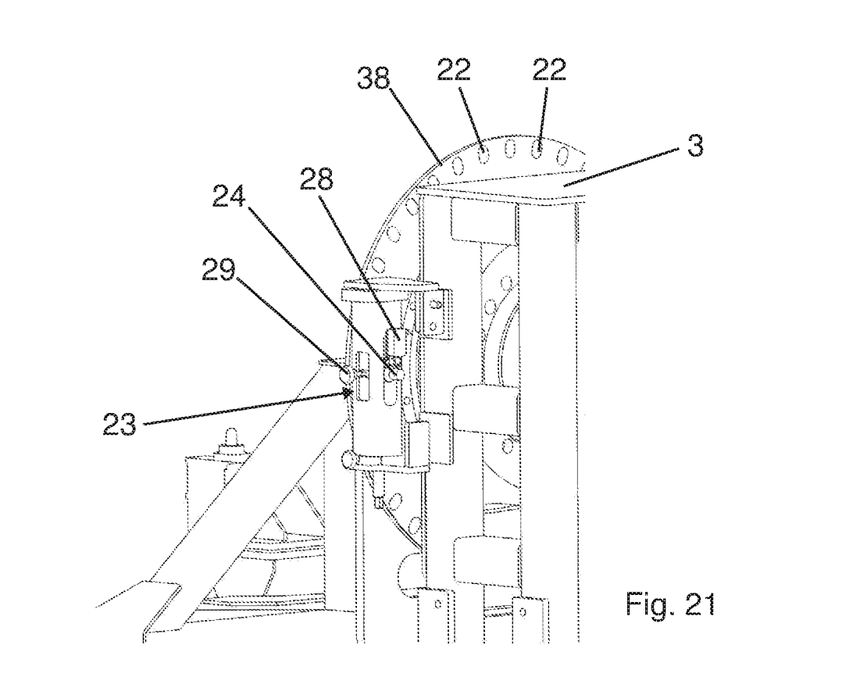
FIG. 21 shows a perspective view of some components of a platform according to the invention.
Figure 22:
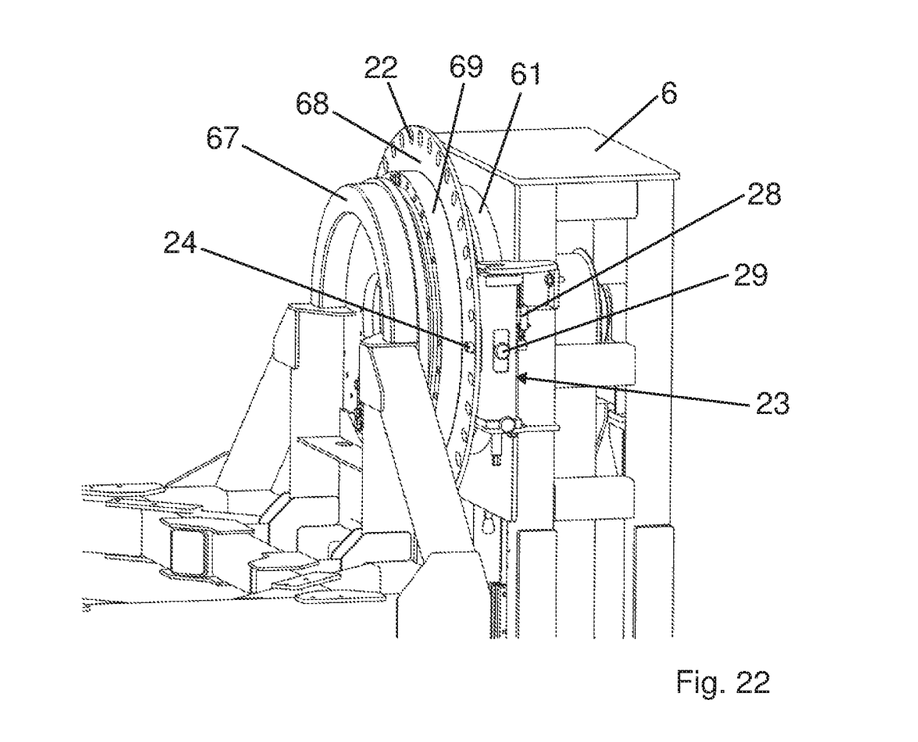
FIG. 22 shows a perspective view of some components of a platform according to the invention.

With reference to FIGS. 21 and 22, each interface disc 38, 68 has a plurality of slots 22, or holes, arranged along a circumference. The column 3, 6 is provided with a safety locking device 23, which comprises a sliding pin 24 which can be inserted in the slot 22 with which it is aligned according to the rotation angle of the interface disc 38, 68. The locking device 23 also comprises a knob 29 to make the pin 24 slide manually, in particular to insert the pin 24 in one of the slots 22 and to disengage it.

When the pin 24 is inserted in a slot 22, the interface disc 38, 68, and thus the respective rotatable support 30, 60, is locked in position.

The locking device 23 is further provided with a sensor, e.g. a microswitch 28, which detects the position of the pin 24.

The locking device 23 is configured so that the pin 24 is normally disengaged, and the microswitch 28 is active. If the microswitch 28 is deactivated, the PLC which controls it cuts off the supply to the ratio motor 11, thus inhibiting all movements.

Preferably, the safety locking devices 23 of the two columns 3, 6 are each engaged/disengaged manually. Preferably, a screw adjustment is also provided to guarantee the alignment of the pin to the slot.

By providing such safety locking devices 23, it is thus possible to lock the rotatable supports 30, 60 with a particular desired rotation angle, as required, e.g. for maintenance operations.

Preferably, both columns 3, 6 are provided with a sensor (not shown), e.g. an inductive sensor, which reads the position of the respective support 30, 60 when it is in zero position.

Each column 3, 6 is also preferably provided with a further sensor (not shown), e.g. a mechanical lever sensor. Such mechanical sensors of the two columns 3, 6 signal to the management system that the rotation of the supports is higher than expected.

Further pads or stop means of mechanical type, which physically limit the rotation of the supports 30, 60, are preferably provided. For example, the column 6 is provided with a block 92 (FIG. 3) which has two mutually opposite abutment surfaces. The supports 30, 60 may abut against such block surfaces 92 which limit the excessive rotation thereof.

Preferably, the platform 1 is provided with a scanner 94 (FIG. 1), e.g. a laser scanner, which is used to detect the presence of an operator aboard the platform 1. Furthermore, at least one beacon 95 (FIG. 2) and/or acoustic signaling device is preferably provided. In the moment immediately preceding the rotation of the body 100, the beacon is activated, e.g. lights up with red light, and an acoustic signal is emitted, to warn the operator to move away from the platform 1.

At this point, the laser scanner is activated and checks that there is no-one aboard the platform 1. Should there be an operator on-board, the supports 30, 60 are not rotated for safety reasons. If, during rotation, the laser scanner detects the presence of an operator on the platform 1, the rotation of the supports 30, 60, and thus of the body 100 fixed to them, is blocked.

For fixing the body 100, each rotatable support 30, 60 is provided with fixing means 93, 96 (shown for example in FIG. 3) which are used to retain the body 100. Typically, the fixing means 93, 96 are inserted in respective holes of the body 100, which are typically underbody holes. Each rotatable support 30, 60 may comprise one or more arms provided with such fixing means 93, 96.

Typically, said arms extend in direction substantially orthogonal with respect to the attachment portion 37, 67 with which the rotatable support 30, 60 is fixed to the respective idle slewing ring 39, 69 and to the respective interface disc 38, 68.

According to an aspect, the invention also provides a skillet conveyor system of a motor vehicle assembly line comprising a plurality of movable platforms 1 arranged in sequence along the assembly line.

The invention claimed is:

1. A movable platform of a skillet conveyor system of a vehicle assembly line, the movable platform comprising:

a substantially flat frame configured to interact with, a track of an assembly line; and a rotation device for rotating a body of a vehicle, said rotation device being fixed to the substantially flat frame of the movable platform and completely integrated with said movable platform;

wherein said rotation device comprises:

a first rotatable support for supporting and rotating either a front part of the body or a rear part of the body, arranged at a first end of the movable platform; and a second rotatable support for supporting and rotating the other of either the front part of the body or the rear part of the body, arranged at a second end of the movable platform, opposite to the first end;

wherein the first rotatable support is motorized, and the second rotatable support is driven by the first rotatable support to synchronize the rotation of the first rotatable support and the rotation of the second rotatable support irrespective of whether the body is supported by the first and second rotatable supports, wherein said rotation device further comprises rotation transmission devices at least partially arranged inside the substantially flat frame of the movable platform, wherein the movable platform further comprising a first column and a second column arranged orthogonally with respect to said flat frame, wherein the first rotatable support is constrained to the first column so as to be able to rotate with respect to the first column and the second rotatable support is constrained to the second column so as to be able to rotate with respect to the second column, and wherein each rotatable support is constrained to the respective column by means of two stewing rings, between which an interface disc is interposed.

2. A movable platform according to claim 1, wherein each rotatable support, integral with a respective first slewing ring of said two slewing rings, is connected to the respective interface disc, integral with a respective second slewing ring of said two slewing rings, by means of fixing means comprising a first pin integral with the interface disc and inserted in at least one elastic bushing inserted in a rigid bushing integral with the rotatable support.

3. A movable platform according to claim 2, wherein said fixing means comprise a second pin, integral with the interface disc and inserted in a housing integral with the rotatable support; wherein there is provided a clearance between the second pin and the housing.

4. A movable platform according to claim 1, wherein there is provided a locking device for each rotatable support.

5. A movable platform according to claim 4, wherein said locking device is a cylinder-piston system, and wherein each rotatable support is provided with an engagement seat for an end of the piston of the respective cylinder-piston system, whereby during an insertion of the end of the piston in the respective engagement seat a rotation of the rotatable supports is forced to a predetermined position.

6. A skillet conveying system of a vehicle assembly line, comprising a plurality of movable platforms according to claim 1, said movable platforms being arranged in sequence along the assembly line.

7. A movable platform of a skillet conveyor system of a vehicle assembly line, the movable platform comprising a rotation device for rotating a body of a vehicle, said rotation means being fixed to the movable platform and completely integrated with said movable platform, wherein said rotation device comprises a first rotatable support for supporting and rotating a front part of the body, arranged at a first end of the movable platform, and a second rotatable support for supporting and rotating a rear part of the body, arranged at a second end of the movable platform, opposite to the first end;

wherein either the first rotatable support or the second rotatable support is motorized, and the other of either said first rotatable support or said second rotatable support is driven;

wherein there is provided a synchronization mechanism to synchronize the rotation of the first rotatable support and the rotation of the second rotatable support;

wherein the synchronization mechanism comprises rotation transmission devices at least partially arranged inside a substantially flat frame of the movable platform;

wherein there are provided a first column and a second column arranged orthogonally with respect to said flat frame, wherein the first rotatable support is constrained to the first column so as to be able to rotate with respect to the first column and the second rotatable support is constrained to the second column so as to be able to rotate with respect to the second column; and wherein each rotatable support is constrained to the respective column by means of two slewing rings, between which an, interface disc is interposed.

8. A movable platform according to claim 7, wherein each rotatable support, integral with a respective first slewing ring of said two slewing rings, is connected to the respective interface disc, integral with a respective second slewing ring of said two slewing rings, by means of fixing means.

9. A movable platform according to claim 8, wherein said fixing means comprise a first pin integral with the interface disc and inserted in at least one elastic bushing inserted in a rigid bushing integral with the rotatable support.

10. A movable platform according to claim 9, wherein said fixing means comprise a second pin, integral with the interface disc and inserted in a housing integral with the rotatable support; wherein there is provided a clearance between the second pin and the housing.

11. A skillet conveyor system of a vehicle assembly line, the skillet conveyor system comprising a plurality of movable platforms arranged in sequence along the assembly line, each of the plurality of movable platforms comprising a rotation device for rotating a body of a vehicle, said rotation device being fixed to the movable platform and completely integrated with said movable platform;

wherein said rotation device comprises:

a first rotatable support for supporting and rotating either a front part of the body or a rear part of the body, arranged at a first end of the movable platform; and a second rotatable support for supporting and rotating the other of either the front part of the body or the rear part of the body, arranged at a second end of the movable platform, opposite to the first end;

wherein, the first rotatable support is motorized, and the second rotatable support is driven by the first rotatable support to synchronize the rotation of the first rotatable support and the rotation of the second rotatable support irrespective of whether the body is supported by the first and second rotatable supports, wherein said rotation device further comprises rotation transmission devices at least partially arranged inside a substantially flat frame of the movable platform, the skillet conveyor system further comprising a first column and a second column arranged orthogonally with respect to said flat frame, wherein the first rotatable support is constrained to the first column so as to be able to rotate with respect to the first column and the second rotatable support is constrained to the second column so as to be able to rotate with respect to the second column, and wherein each rotatable support is constrained to the respective column by means of two slewing, rings, between which an interface disc is interposed.

12. A skillet conveyor system according to claim 11, wherein each rotatable support, integral with a respective first slewing ring of said two slewing rings, is connected to the respective interface disc, integral with a respective second slewing ring of said two slewing rings, by means of fixing means comprising a first pin integral with the interface disc and inserted in at least one elastic bushing inserted in a rigid bushing integral with the rotatable support.

13. A skillet conveyor system according to claim 12, wherein said fixing means comprise a second pin, integral with the interface disc and inserted in a housing integral with the rotatable support; wherein there is provided a clearance between the second pin and the housing.

14. A skillet conveyor system according to claim 11, wherein there is provided a locking device for each rotatable support.

* * * * *